(12) United States Patent
Welter et al.

(10) Patent No.: US 8,505,254 B2
(45) Date of Patent: Aug. 13, 2013

(54) FASTENING SYSTEM FOR A PLATE-SHAPED STRUCTURAL ELEMENT

(75) Inventors: Christian Welter, Frankfurt am Main (DE); Roland Neuner, Bad Nauheim (DE); Roland Schweizer, Aichtal-Groetzingen (DE)

(73) Assignee: Monier Technical Centre GmbH, Heusenstamm (DE)

( * ) Notice: Subject to any disclaimer, the term of this patent is extended or adjusted under 35 U.S.C. 154(b) by 143 days.

(21) Appl. No.: 12/864,623

(22) PCT Filed: Jan. 30, 2009

(86) PCT No.: PCT/DE2009/000140
§ 371 (c)(1),
(2), (4) Date: Dec. 20, 2010

(87) PCT Pub. No.: WO2009/095009
PCT Pub. Date: Aug. 6, 2009

(65) Prior Publication Data
US 2011/0154750 A1 Jun. 30, 2011

(30) Foreign Application Priority Data
Feb. 2, 2008 (DE) .......................... 10 2008 007 334

(51) Int. Cl.
*E04B 1/70* (2006.01)

(52) U.S. Cl.
USPC ................ 52/302.3; 52/520; 52/543; 52/544; 52/547

(58) Field of Classification Search
USPC .................. 52/302.3, 173.3, 518, 520, 586.1, 52/656.1, 586.2, 582.1; 136/244
See application file for complete search history.

(56) References Cited

U.S. PATENT DOCUMENTS

| 7,915,519 B2 * | 3/2011 | Kobayashi ................ 136/251 |
| 2004/0011354 A1 | 1/2004 | Erling |
| 2007/0131273 A1 * | 6/2007 | Kobayashi ................ 136/251 |

FOREIGN PATENT DOCUMENTS

| CH | 684202 | 7/1994 |
| DE | 20303431 | 6/2003 |
| WO | WO2004079775 | 9/2004 |

OTHER PUBLICATIONS

Examination Request dated Oct. 30, 2008 corresponding to German Patent Application No. 10 2008 007 334.2-25.
International Search Report corresponding to International application No. PCT/EP2009/000140 dated Aug. 18, 2009.

* cited by examiner

*Primary Examiner* — William Gilbert
*Assistant Examiner* — Patrick Maestri
(74) *Attorney, Agent, or Firm* — Ohlandt, Greeley, Ruggiero & Perle, LLP

(57) ABSTRACT

A fastening system for a plate-shaped structural element on a pitched roof is provided. The plate-shaped structural element is bordered in a water-tight manner in a frame and fully replaces the roof covering, and the eaves-side and ridge-side cross beams of the frame which run transversely to the ridge-eaves direction have profiles which are matched to each other and engage in each other. The top side of the eaves-side cross beam has a mounting that surrounds the edge of the plate-shaped structural element, and the bottom side thereof has a support for fastening to the roof structure. The support includes a web that extends from the mounting to the support, a protrusion extending beneath the mounting and receives an extension that extends from the ridge-side cross beam thereof.

18 Claims, 2 Drawing Sheets

FASTENING SYSTEM FOR A PLATE-SHAPED STRUCTURAL ELEMENT

CROSS REFERENCE TO RELATED APPLICATIONS

This application is a National Stage entry of International Application No. PCT/DE2009/000140, which was filed on Jan. 30, 2009, which claims the benefit of German Patent Application No. 10 2008 007 334.2, filed Feb. 2, 2008, the entire contents of both of which are incorporated herein by reference.

BACKGROUND OF THE INVENTION

1. Field of the Invention

The invention relates to a fastening system for a plate-shaped structural element on a pitched roof, wherein the plate-shaped structural element is bordered in a water-tight manner in a frame of profiled beams, to form a module, and fully replaces the roof covering, wherein the eaves-side and ridge-side cross beams of the frame which run transversely to the ridge-eaves direction have profiles which are matched to each other and engage in each other in order to install modules which are adjacent in the ridge-eaves direction, these profiles forming a rain-proof joint such that the modules partially overlap in the longitudinal direction only in the region of these cross beams. Plate-shaped structural elements to be considered are, in particular, rectangular photovoltaic modules (PV modules) or solar thermal modules.

2. Description of Related Art

A fastening system of this type is known from DE 203 03 431.7-U1. In this fastening system for a plate-shaped structural element on a pitched roof, in particular for a photovoltaic module, the plate-shaped structural element replaces the roof covering and rests on at least two beams arranged in the ridge-eaves direction, wherein beams are provided at all edges of the plate-shaped structural element and form a base frame that supports the plate-shaped structural part, engages laterally around it and borders it on the top side in a water-tight manner.

In the text which follows, the ridge-eaves line is denoted as the longitudinal direction, and a parallel to the ridge or to the eaves is denoted as the transverse direction. In the fastening system mentioned above, the plate-shaped structural elements are laid so as to overlap in an imbricated manner in the longitudinal direction. A photovoltaic module has a laminate with photovoltaic elements and a frame. Even during production, a plurality of photovoltaic elements of a laminate are electrically connected in series to form a voltage chain in order to make a higher voltage available. A disadvantage in this connection is that an element which is in shade reduces the efficiency of the entire chain. Laminates are therefore designed in such a way that no shading takes place after they have been properly installed on the roof. At present, the majority of laminates are produced so as to form modules for on-roof installation, the modules being installed on is beams in the manner of a roof hook over the roof covering. A plurality of modules lie parallel next to each other in the longitudinal direction and in the transverse direction so that no shading takes place. The beams on the edges cover the top side of the laminates only in an extremely narrow edge region, and therefore virtually the entire surface of a laminate is covered by photovoltaic elements.

In the case of in-roof laying which has been conventional to date and where photovoltaic modules replace the roof covering, the imbricated overlapping in the longitudinal direction means that the overlapped part of the laminate may not contain any photovoltaic elements. This makes production more expensive and requires special production procedures.

BRIEF SUMMARY OF THE INVENTION

It is an object of the present invention to provide a fastening system which makes it possible to also use plate-shaped structural elements, in particular large-surface-area photovoltaic laminates produced in series for on-roof installation, in modules for in-roof laying.

According to the invention, the object is achieved in that the top side of the eaves-side cross beam is provided with a mounting which surrounds the edge of the plate-shaped structural element in a U-shaped manner, and the bottom side thereof is provided with a support for fastening to the roof structure, comprising a web that extends from the lower limb of the mounting and leads to the support, a protrusion extending beneath the mounting from that side of the web which points toward the eaves such that a channel is produced between the mounting and the protrusion, and in that the ridge-side cross beam has an extension which points toward the ridge and, during the installation of a second module close to the eaves, can be inserted into the channel of the eaves-side cross beam of the first module.

In other words, the ridge-side and eaves-side cross beams of the frame which run transversely to the ridge-eaves direction have profiles which are matched to each other and engage in each other in modules which are adjacent in the ridge-eaves direction, these profiles forming a rain-proof joint such that the modules partially overlap in the longitudinal direction only in the region of these cross beams. No additional sealing material is required owing to the rain-proof joint.

Modules of this type, which, at the longitudinal edges, have longitudinal beams with profiles, known per se, with a cover profile at one edge and a water course at the other edge, can be supplied as prefabricated units so that installation on the roof is very simple. Extremely economical installation is possible as a result of this and also because an additional roof covering is not required.

The mounting which is provided on the top side of the eaves-side cross beam and surrounds the edge of the plate-shaped structural element in a U-shaped manner ensures secure fastening of the plate-shaped structural element. The upper limb of the U can rest on the plate-shaped structural element. The plate-shaped structural element can be adhesively bonded to the upper limb. In another embodiment, the plate-shaped structural element can also be supported on the lower limb.

The installation in the ridge-eaves direction takes place conveniently because the bottom side of the eaves-side cross beam is provided with a support for fastening to the roof structure. The eaves-side cross beam supports the ridge-side beam of the adjacent module such that the latter does not have to be fastened separately. At the start of the laying process, a cross beam which is designed in the manner of an eaves-side cross beam, but without a mounting for a plate-shaped structural element, is installed close to the ridge. The cross beams of two adjacent modules engage in each other in a rain-proof manner because the eaves-side cross beam has a channel which, during the installation on the roof, can receive an extension of the adjacent ridge-side cross beam. The ridge-side cross beam is overlapped at an extension which points toward the ridge and, during the installation of a second module close to the eaves, can be inserted into the channel of the eaves-side cross beam of the first module. It is particularly simple to insert the second module if the protrusion, which forms the bottom side of the channel, on the web of the eaves-side cross beam ends in a downwardly curved or beveled manner, such that the channel extends in the manner of a funnel. This simplifies the insertion of the second module from the eaves.

The support of the eaves-side cross beam can conveniently be screwed to the roof structure from the top side if the support protrudes in the direction of the eaves. As a result, tools such as cordless screwdrivers and the like can be inserted unhindered from above.

A support strip which runs in the transverse direction is advantageously installed under the support so that screw holes provided in the support by the manufacturer can be used independently of the spacing between the rafters.

The ridge-side cross beam is supported in a simple manner if it is angled off at its base such that, when two modules are installed, the angled-off portion rests on the support of the adjacent eaves-side cross beam.

Since the efficiency of a PV module decreases as the temperature increases, it is advantageous if the plate-shaped structural element is back-ventilated for cooling purposes. For this purpose, ventilation openings are advantageously provided in the cross beam. In addition to the ventilation openings, it is possible to provide holes for the discharge of condensation water and/or leaking water.

Any water and condensation water driven in is channeled away to the water course of the side beams if the bottom side of the extension of the ridge-side cross beam is provided with a water channel which is open to the top in the direction of the ridge and into which the protrusion from the web of the eaves-side cross beam of the first module can protrude. The water channel has a particularly favorable shape if the bottom side thereof is angled off or curved obliquely upward.

In order to form a labyrinth in the overlapping region of two adjacent cross beams, it is advantageous if a bead which is spaced apart from the web and protrudes into the channel in the direction of the protrusion is provided on the bottom side of the lower limb of the mounting.

The penetration of driving rain is prevented if a lip is provided on the top side of the extension of the ridge-side cross beam and, when two modules are installed, bears against the bead on the bottom side of the lower limb of the mounting of the eaves-side cross beam. This labyrinth-like design of the overlapping region of the two cross beams makes it possible to dispense with all sealing material, such that modules of this type can also be laid when exerting less force. Problems known in association with aging sealing material are also ruled out.

A connection hood or a connection of plastically deformable material is to be provided for the water-tight connection of the module to be installed closest to the ridge, adjoins said module and can reach, on the ridge side, under adjacent roofing material. Modules are optimally sealed at the side by side aprons which adjoin the longitudinal beams and can be connected laterally to adjacent roofing material.

An end apron is suitable for joining the module to be installed closest to the eaves in a rain-tight manner, adjoins said module and can rest, on the eaves side, on adjacent roofing material. The end apron preferably consists of material which can be plastically deformed manually. The use of plastically deformable material has the advantage that said material can easily be adapted to different profile shapes of roof slabs at the construction site.

Further details, advantages and features of the invention emerge not only from the claims, the features which can be gathered from these, per se and/or in combination, but also from the following description of a preferred exemplary embodiment (illustrated in the drawing).

DETAILED DESCRIPTION OF THE INVENTION

Figure 1:
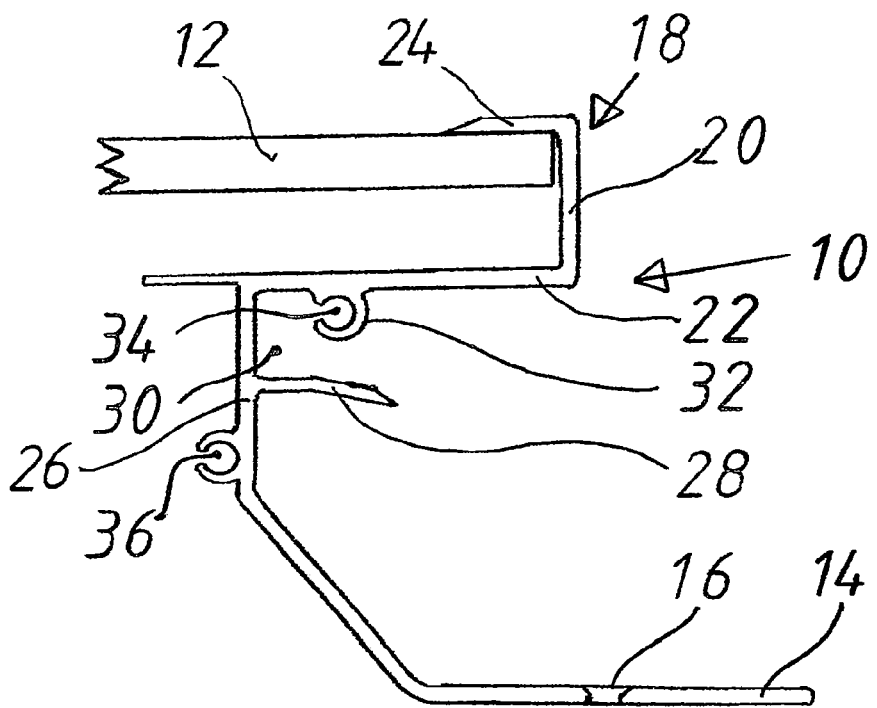
FIG. 1 shows a cross section of an eaves-side cross beam.

FIG. 1 schematically shows a cross section of an eaves-side cross beam 10 with an edge portion of a first plate-shaped structural element 12, here a laminate measuring 80×160 cm having photovoltaic elements. The bottom side of the eaves-side cross beam 10, an extruded profile of an aluminum alloy, has a support 14 which protrudes in the direction of the eaves and has screw holes 16 for fastening to the roof structure. The top side of the eaves-side cross beam 10 is provided with a U-shaped mounting 18 which surrounds the edge of the plate-shaped structural element 12. The U-shaped mounting 18 has a base 20 of the U, a lower limb 22 of the U and an upper limb 24. The upper limb 24 is joined to the plate-shaped structural element 12 by an adhesive. A web 26 that leads to the support 14 extends from the lower limb 22 of the mounting 18 and, on its side which points toward the eaves, has a downwardly curved protrusion 28 beneath the mounting 18, as a result of which a channel 30 is produced between the mounting 18, the web 26 and the protrusion 28. A bead 32 which is spaced apart from the web 26 and protrudes into the channel 30 in the direction of the protrusion 28 is provided on the bottom side of the lower limb 22 of the mounting 18. The bead 32 is in the form of an open loop on its side pointing toward the web 26, such that a slotted tube 34 is produced. A further slotted tube 36 is provided on that side of the web 26 which points toward the ridge. During the installation of the modules at the factory, the slotted tubes 34, 36 receive self-tapping screws which serve to fasten the lateral longitudinal beams. The overall height of the eaves-side cross beam 10 from the support 14 to the upper limb 24 is about 7 cm.

Figure 2:
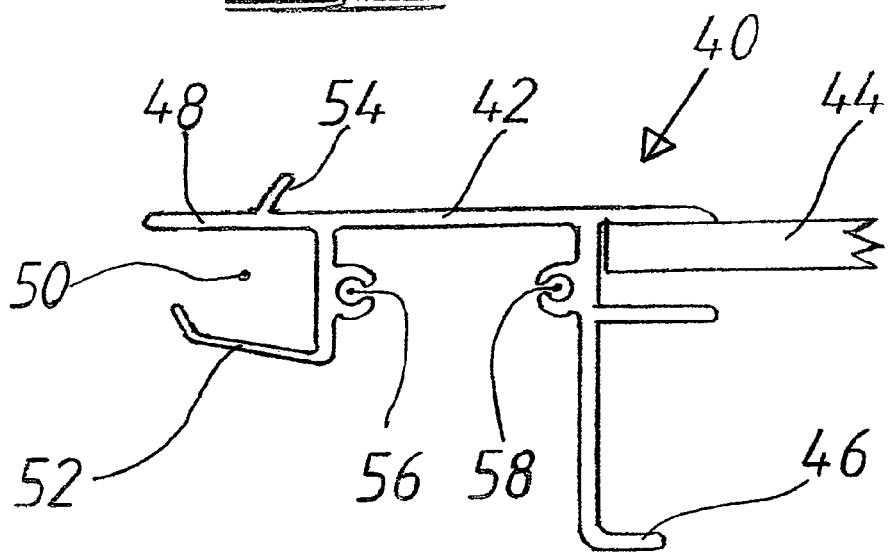
FIG. 2 shows a cross section of a ridge-side cross beam.

FIG. 2 schematically shows a cross section of a ridge-side cross beam 40 which consists of an approximately T-shaped extruded profile made from an aluminum alloy. In the direction of the eaves, the upper girder 42 covers the edge of a second plate-shaped structural element 44, in this case too a laminate measuring 80×160 cm having photovoltaic elements, and is joined thereto by an adhesive. The base of the ridge-side cross beam 40 is provided with an angled-off portion 46 which, when two modules are installed, rests on the support 14 of the adjacent eaves-side cross beam 10. In the direction of the ridge, the upper girder 42 is provided with an extension 48 which, during installation, can be inserted into the channel 30 of the eaves-side cross beam 10. The bottom side of the extension 48 is provided with a water channel 50 which is open in the direction of the ridge and into which the protrusion 28 from the web 26 of the eaves-side cross beam 10 can protrude. The bottom side 52 of the water channel 50 is angled off obliquely upward. A lip 54 is provided on the top side of the extension 48 of the ridge-side cross beam 40 and, when two modules are installed, bears against the bead 32 on the bottom side of the lower limb 22 of the mounting 18 of the adjacent eaves-side cross beam 10. Slotted tubes 56, 58 for receiving self-tapping screws are also arranged on the ridge-side cross beam 40, these screws serving to fasten the lateral longitudinal beams. The overall height of the ridge-side cross beam 40 from the angled-off portion 46 to the upper girder 42 is about 4 cm.

Figure 3:
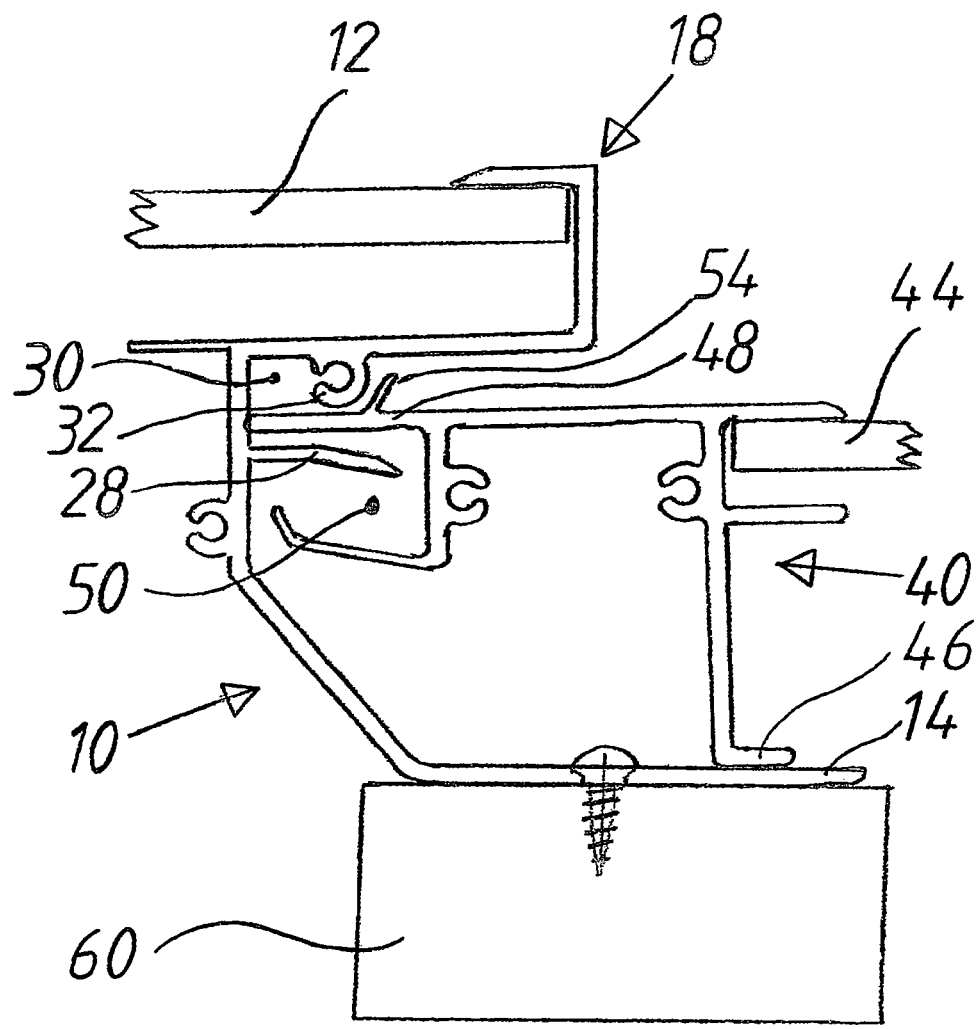
FIG. 3 shows a cross section of the cross beams, shown in FIG. 1 and FIG. 2, joined to each other.

FIG. 3 shows a schematic cross section of the ridge-side cross beam 40, shown in FIG. 2, joined to the eaves-side cross beam 10 shown in FIG. 1. FIG. 3 clearly shows the complementary design of the profiles and the interaction when the two beams engage in each other when installed. The eaves-side cross beam 10 is fixedly screwed by way of its support 14 to a support strip 60. The ridge-side cross beam 40 of the adjacent module rests on the support 14 with its angled-off portion 46 and is supported thereby. The extension 48 of the ridge-side cross beam 40 rests on the protrusion 28 in the channel 30 of the eaves-side beam 10 and the protrusion 28 protrudes into the water channel 50 of the ridge-side cross beam 40. The lip 54 bears against the bead 32 such that these together form a labyrinth seal. At the same time, the bead 32 rests on the top side of the extension 48 and thus prevents the ridge-side cross beam 40 from being lifted off from the eaves-side cross beam 10. An overlap is produced exclusively in the region of the cross beams 10, 40, and therefore the second plate-shaped structural element 44 is not put in shade by the first plate-shaped structural element 12 or else by the eaves-side cross beam 10 thereof.

The invention claimed is:

1. A fastening system for a plate-shaped structural element on a pitched roof having a roof covering, comprising:
    a frame of profiled beams configured to border, in a watertight manner, the plate-shaped structural element to form a module, the module being configured to fully replace the roof covering of the pitched roof,
    the frame of profiled beams including an eaves-side cross beam and a ridge-side cross beam, each of the eaves-side cross beam and ridge-side cross beam having profiles that match each other and engage each other, the profiles forming a rain-proof joint such that an adjacent module partially overlaps in the longitudinal direction only in the region of the eaves-side and ridge-side cross beams,
    the eaves-side cross beam having a top side provided with a mounting that surrounds an edge of the plate-shaped structural element in a U-shaped manner, and having a bottom side provided with a support for fastening to the roof structure,
    the support comprising a web that extends from a lower limb of the mounting and leads to the support, a protrusion that extends beneath the mounting from a side of the web so that a channel is defined by the mounting, the web, and the protrusion, and
    the ridge-side cross beam having an extension that can be inserted into the channel of the eaves-side cross beam of the adjacent module,
    wherein the ridge-side cross beam has an angled-off portion that rests on the support of the eaves-side cross beam of the adjacent module.

2. The fastening system as claimed in claim 1, wherein the support protrudes in an eaves direction.

3. The fastening system as claimed in claim 2, further comprising screw holes provided in the support.

4. The fastening system as claimed in claim 1, further comprising ventilation openings in the eaves-side cross beam and the ridge-side cross beam.

5. A fastening system for a plate-shaped structural element on a pitched roof having a roof covering, comprising:
    a frame of profiled beams configured to border, in a watertight manner, the plate-shaped structural element to form a module, the module being configured to fully replace the roof covering of the pitched roof,
    the frame of profiled beams including an eaves-side cross beam and a ridge-side cross beam, each of the eaves-side cross beam and ridge-side cross beam having profiles that match each other and engage each other, the profiles forming a rain-proof joint such that an adjacent module partially overlaps in the longitudinal direction only in the region of the eaves-side and ridge-side cross beams,
    the eaves-side cross beam having a top side provided with a mounting that surrounds an edge of the plate-shaped structural element in a U-shaped manner, and having a bottom side provided with a support for fastening to the roof structure,
    the support comprising a web that extends from a lower limb of the mounting and leads to the support, a protrusion that extends beneath the mounting from a side of the web so that a channel is defined by the mounting, the web, and the protrusion, and
    the ridge-side cross beam having an extension that can be inserted into the channel of the eaves-side cross beam of the adjacent module,
    wherein the extension of the ridge-side cross beam has a bottom side that is provided with a water channel open in a ridge direction and into which the protrusion from the web of the eaves-side cross beam of the adjacent module protrudes.

6. The fastening system as claimed in claim 5, further comprising a bead spaced apart from the web and protruding into the channel in the direction of the protrusion, the bead being provided on a bottom side of the lower limb.

7. The fastening system as claimed in claim 6, further comprising a lip on a top side of the extension of the ridge-side cross beam, the lip of the module bearing against the bead of the adjacent module.

8. A fastening system for plate-shaped structural element on a pitched roof having a roof covering, comprising:
    a first watertight module having an eaves-side cross beam with a bottom side and a top side, the bottom side including a support, the top side including a U-shaped mounting for surrounding an edge of a first plate-shaped structural element, the U-shaped mounting having a base, a lower limb, and an upper limb, the upper limb being adhesively joinable to the edge of the first plate-shaped structural element, the lower limb having a web extending from the U-shaped mounting to the support, the web having a downwardly curved protrusion defining a channel between the mounting, the web, and the protrusion, wherein the lower limb further includes a bottom side having a first bead protruding into the channel in the direction of the protrusion; and
    a second watertight module having a ridge-side cross beam, the ridge-side cross beam having an upper girder and a base, the base including an angled-off portion resting on the support of the eaves-side cross beam of the first watertight module, the upper girder for covering and adhesively joining to an edge of a second plate-shaped structural element, the upper girder including an extension inserted into the channel of the eaves-side cross beam of the first watertight module so that the extension rests on the protrusion of the eaves-side cross beam of the first watertight module, the upper girder further including a water channel into which the protrusion from the web of the eaves-side cross beam of the first watertight module protrudes, wherein the extension includes a lip on a top side of the extension, the lip bearing against the first bead of the eaves-side cross beam of the first watertight module.

9. The fastening system as claimed in claim 8, wherein the water channel of the second watertight module includes a bottom side that is angled obliquely upward.

10. The fastening system as claimed in claim 8, wherein the first bead comprises an open loop pointing toward the web.

11. The fastening system as claimed in claim 10, wherein the first bead comprises a slotted tube configured to receive a self-tapping screw.

12. The fastening system as claimed in claim 11, wherein the web further includes a second bead on a ridge side of the web, the second bead also comprising a slotted tube configured to receive a self-tapping screw.

13. The fastening system as claimed in claim 8, wherein the ridge-side cross beam further comprises a pair of slotted tubes each configured to receive a self-tapping screw.

14. The fastening system as claimed in claim 8, wherein the lip bears against the first bead to form a labyrinth seal.

15. The fastening system as claimed in claim 8, wherein the eaves-side cross beam and the ridge-side cross beam produce an overlap so that the second plate-shaped structural element is not shaded by the first plate-shaped structural element or by the eaves-side cross beam.

16. The fastening system as claimed in claim 8, wherein the support further comprises screw holes for fastening to the roof structure.

17. The fastening system as claimed in claim 8, wherein the eaves-side cross beam and the ridge-side cross beam each comprises ventilation openings.

18. A fastening system for a plate-shaped structural element on a pitched roof having a roof covering, comprising:

a frame of profiled beams configured to border, in a watertight manner, the plate-shaped structural element to form a module, the module being configured to fully replace the roof covering of the pitched roof, the frame of profiled beams including an eaves-side cross beam and a ridge-side cross beam have profiles that match each other and engage each other, the profiles forming a rain-proof joint such that an adjacent module partially overlap in the longitudinal direction only in the region of the eaves-side and ridge-side cross beams, the eaves-side cross beam having a top side provided with a mounting that surrounds an edge of the plate-shaped structural element in a U-shaped manner, and having a bottom side provided with a support for fastening to the roof structure, the support comprising a web that extends from a lower limb of the mounting and leads to the support, a protrusion that extends beneath the mounting from a side of the web so that a channel is produced between the mounting and the protrusion, the ridge-side cross beam having an extension that can be inserted into the channel of the eaves-side cross beam of the adjacent module, a bead spaced apart from the web and protruding into the channel in the direction of the protrusion, the bead being provided on a bottom side of the lower limb, and a lip on a top side of the extension of the ridge-side cross beam, the lip of the module bearing against the bead of the adjacent module.

\* \* \* \* \*